United States Patent Office 3,413,055
Patented Nov. 26, 1968

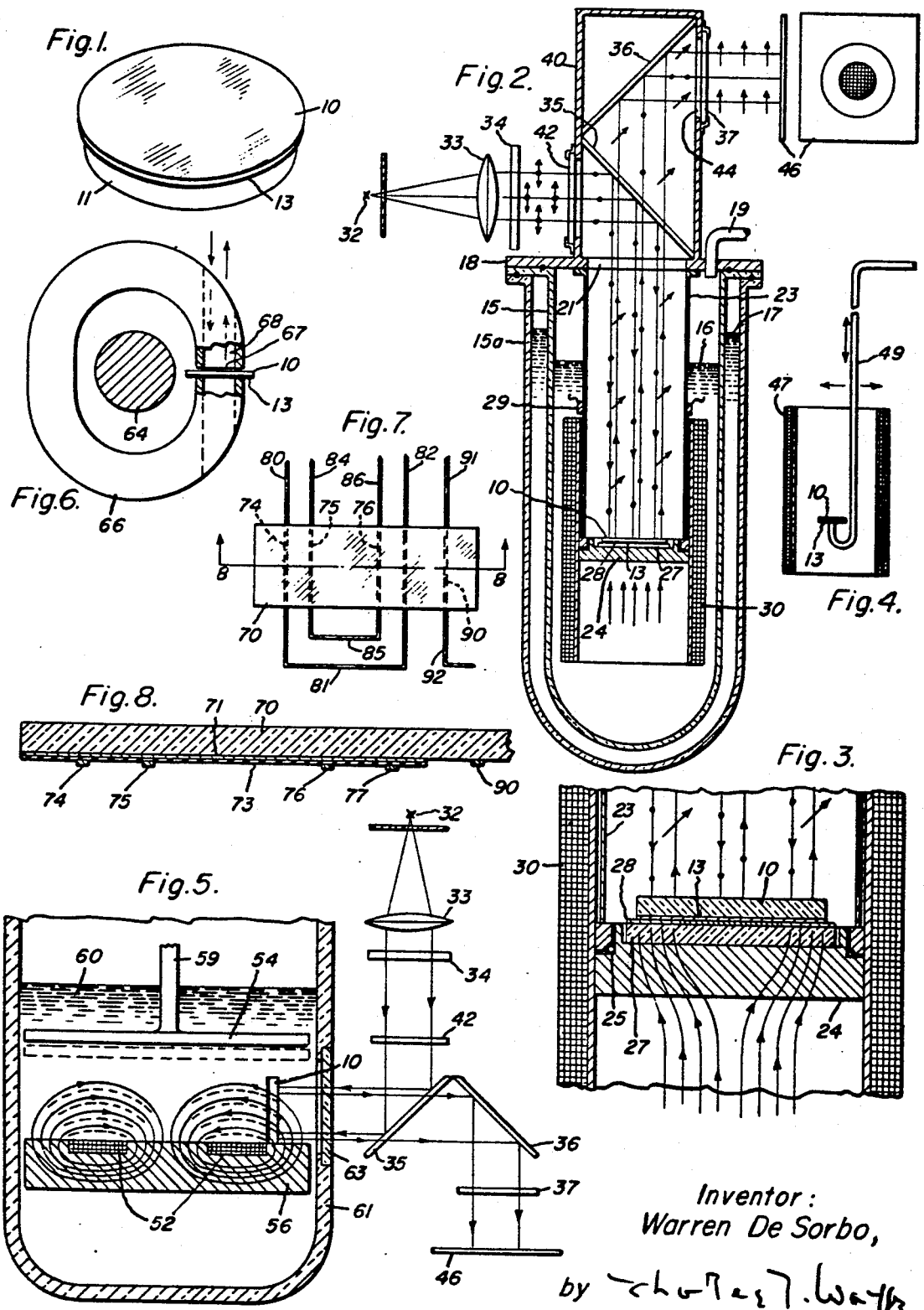

3,413,055
MAGNETO-OPTIC GLASS BODY AND ELECTRIC CIRCUIT ELEMENT IN READ-OUT APPARATUS INCLUDING THE SAME
Warren De Sorbo, Ballston Lake, N.Y., assignor to General Electric Company, a corporation of New York
Filed Apr. 12, 1961, Ser. No. 102,411
5 Claims. (Cl. 350—151)

The present invention relates generally to the non-destructive testing art and is more particularly concerned with novel devices and apparatus employing the magneto-optic Faraday effect for a variety of new purposes.

Prior to this invention it was not possible to map or to measure continuously, even in part, the magnetic field within the core of a solenoid. Likewise it was impossible accurately to measure pressures and especially relatively small pressure changes at very low temperatures. Further, despite a long-standing and well-recognized need for an ammeter operative in closed superconducting circuits, no such device has hitherto been known. Similarly, the increasingly urgent demand for a strain gauge for superconducting films necessary for more efficient operation of devices using these films has not been met by the prior art.

By virtue of this invention, it is now possible easily and economically to meet all these demands and to provide tools or devices having special utility and value for other important purposes. Thus this invention, which is based on discoveries of mine subsequently to be described in detail, fulfills an existing need of substantial dimensions and promises expanding utility, particularly in the field of superconducting circuitry. In fact, its value as a scientific tool for several applications has already been firmly established.

While, as indicated above, this invention in all its forms and embodiments and applications or uses involves as an essential feature the Faraday or magneto-optic phenomenon, it is recognized that this phenomenon and devices for producing it are old and well known in prior art dating back over one hundred years. Thus it is not in the creation of this phenomenon or in general in its use that the present invention resides. Rather, it is the particular devices and combinations of devices or apparatus which greatly expand the possibilities of using this phenomenon that represent this invention. These new devices and apparatus accordingly constitute in tangible or structural form the principal concepts constituting this invention.

A principal discovery upon which these concepts are predicated is that under certain critical circumstances the magneto-optic Faraday effect can be developed to the extent that the high degree of sensitivity required to detect magnetic fields of extremely small strength can be achieved. This is surprising in view of the rather gross and insensitive nature of the magneto-optic Faraday effect that could be produced by any means under any conditions in accordance with the prior art. I have further discovered that this new result can not be achieved by following the teachings of the prior art and also that it can not be obtained by making certain substantial modifications in the prior art devices and operating conditions which might reasonably be expected to lead to improved results. Additionally, I have found that in particular it is absolutely essential to the new results of this invention to use a magneto-optic Faraday body which is wholly different in physical form from those known in the prior art. It is not possible, for example, to obtain these new results where the magneto-optic Faraday body is in the form of a frozen cerous nitrate-glycerol solution; and it also is not possible to secure certain of these results if the Faraday body in plate-like form is thicker than a certain critical limit, or if this body is not substantially free from cracks and other light transmission-impairing defects. Also, it is essential to certain of these results that the plate-like magneto-optic body be ground and polished to optical precision on its top and bottom surfaces and that these surfaces therefore be substantially planar and that they be in planes which are parallel to each other within very narrow limits. However, I have found that when all these requirements are met in such a body, that body is a powerful new tool having a number and variety of new uses. It is, therefore, from these discoveries and the possibilities newly opened as a result of them that the principle concepts of this invention arise.

One of the novel concepts of this invention concerns the new magneto-optic Faraday body which, as will subsequently be described in detail, differs in vitally important ways from the devices of the prior art. The novel concept of measuring pressures at low temperatures in turn arises out of the discovery that this new body is surprisingly sensitive to magnetic fields and out of the recognition of the fact that small magnetic fields may be distorted in various ways in response to pressure changes in a system. Similarly, the concept of measuring magnetic fields within a solenoid arises from the discovery of this extreme sensitivity of this new Faraday body coupled with the idea of traversing the solenoid core with this body and optically reading out changes or variations in magnetic field strength indicated by the body. Still further, it is conceived that by employing this extremely sensitive new body, inhomogenous strains in superconducting films can be readily and quickly detected and charted. Again, the idea is to use the body in such a way as to enable visual observation of magnetic field characteristics produced when the superconducting film is subjected to an externally applied magnetic field. Such strains exert an effect upon the distribution of and location of these strains, as well as variations in the formities of the field may be used to indicate the presence and location of these starins, as wel las variations in the intensity of said strains. The concept upon which the new magneto-optic, electric circuit-testing apparatus of this invention is based is a similar idea, namely that through the use of one of these new Faraday bodies the magnetic field of a conductor or a superconductor or a plurality of conductors or superconductors may be optically detected in a quantitative manner simply by positioning the conductor or other element closely adjacent to or even against the surface of the Faraday body, and then observing the body through the usual polarized light source and analyzer system.

Those skilled in the art will understand that in one aspect the present invention, broadly described, comprises a light-transmitting, plate-like body having optically smooth top and bottom surfaces. This body has the magneto-optic Faraday property and on one of its surfaces is provided with a coating so that the body acts as a back surface mirror to reflect light beams striking or incident to another of its surfaces. In more specific terms, the body is preferably approximately 1.5 mm. thick and its top and bottom surfaces are disposed in planes which are parallel to each other within 0.0005 inch over the greatest dimension of the body. Also, this body is substantially free from cracks and other light-impairing defects and preferably the mirror coating is approximately 0.002 mm. thick and is of either silver or aluminum. This is also preferably a cerous phosphate glass body although, as will be described, it may be of other compositions or materials and likewise its dimensions may vary within certain ranges from those indicated above as being preferred.

In one of its embodiments as an electric circuit element this invention comprises a magneto-optic Faraday body and an electric conductor secured to the body and extending across a portion of its surface. This conductor is in the form of a relatively thin and narrow deposit on the surface of the body and is adapted to be connected to electric leads for integration in an electric circuit. In this case the body may advantageously be in the preferred from above described. Further, by providing an insulating coating on the mirror coat of metal on the body an electric conductor may be applied as a film deposited on the insulating coating. Alternatively, the conductor may be applied directly to the surface of the body, suitably in the form of an evaporated film in which case the conductor serves as the reflecting element and no other mirror coating is applied to the body. In special applications or uses of this general concept the device may be a superconducting circuit element, a cryotron including a gate-conductor and a control conductor being provided on the body, the conductors again being in the form of films which are suitably applied to or deposited on the surface of the body or, if desired, provided on the surface of an insulating coating where a mirror coat of metal is used. By providing means for subjecting the superconductors in such a device to a temperature range below superconducting critical temperatures, a novel apparatus or assembly is produced.

In another aspect of this invention, a novel Faraday body, as previously described, comprises one element of an apparatus including means for producing polarized light for transmission into the body, means for analyzing the light reflected from the body, means for subjecting the body to a magnetic field, and means for varying the field in response to changes in pressure to be measured complete the assembly.

In still another embodiment of this invention in its apparatus aspect, the novel, plate-like magneto-optic body described above is incorporated as an element in a structure including a solenoid means for supporting the Faraday body within the core of the solenoid so that the body can be moved through the core and radially of the solenoid. This apparatus also incorporates an optical system including a polarized light source, means for directing polarized light into the Faraday body and companion means for analyzing light reflected from the body. It will be understood, however, that other magentic field-generating means may be used in this case. Accordingly, in this embodiment the invention is useful in measuring magnetic fields of sources other than solenoids.

In apparatus similar to that just described, the Faraday body is combined with a solenoid for the purpose of measuring inhomogeneous strains in a sample of superconducting film. In this embodiment of the invention which includes the polarized light source means and the light analyzer means, as described above, means are provided for supporting a superconducting film sample in fixed or stationary position within the solenoid core. The Faraday body then is disposed adjacent to, suitably resting on and supported by, the superconducting film sample.

Those skilled in the art will gain a further and better understanding of this invention from the detailed description set forth below, reference being had to the drawings accompanying and forming a part of this specification in which:

FIGURE 1 is a perspective view of a Faraday body of this invention in assembly with a sample the transverse magnetic field of which is to be measured or charted depending upon the use being made of this device;

FIGURE 2 is a vertical section view of apparatus embodying this invention and incorporating the Faraday body of FIGURE 1, for the measurement of inhomogenous strains in superconducting films;

FIGURE 3 is an enlarged fragmentary view of the FIGURE 2 apparatus, showing in more detail the central components of the apparatus including the Faraday body and illustrating the principle involved in the operation of this equipment;

FIGURE 4 is a vertical sectional view of a solenoid and movable Faraday body assembly which may be substituted for the solenoid and Faraday body supporting assembly of the apparatus of FIGURE 2, for measuring and mapping the magnetic field within the solenoid core;

FIGURE 5 is a fragmentary, vertical sectional view of apparatus for measuring changes in pressure occurring at very low temperatures, optical elements of the apparatus and their functions being shown schematically as in FIGURE 2;

FIGURE 6 is an elevational view showing an ammeter of this invention in operative relation to a conductor, parts being broken away in the interest of clarity;

FIGURE 7 is a partly diagrammatic plan view of the novel magneto-optic body of this invention as a component in an electrical circuit; and FIGURE 8 is a sectional view of the FIGURE 7 device taken on line 8—8 thereof.

As illustrated in FIGURE 1, the new Faraday body of this invention may desirably take the form of a thin plate or disc. Thus disc 10 is a magneto-optic body of this invention while cylinder 11 is a permanent magnet specimen, the distribution and flux density of the magnetic field of which is observable with the aid of disc 10. Disc 10 is centered upon and supported by specimen 11 and is of slightly greater diameter than the specimen. Disc 10 is also quite thin, being of the order of less than about 1.5 mm. thick, and its top and bottom surfaces are ground and polished so that they are "optically smooth" or "optically polished." In other words as those skilled in the art will understand, the top and bottom surfaces of this Faraday body have no defects such as scratches, frosting or "orange peel" which are visible to the naked eye. Superficial defects of this type which may be seen under a microscope even at low magnification do not, however, disqualify the body under the foregoing definition or description. As will subsequently be described, disc 10 may be provided with various covers or coatings depending upon the uses to which it is to be put in accordance with this invention, but in all cases the top and bottom surfaces of the body will be disposed in planes parallel to each other within about 0.001 inch over the greatest dimension of the body regardless of the shape or form in which it may be used. Unless the top and bottom surfaces of disc 10 are substantially planar, that is, for all practical purposes are largely disposed in planes which are parallel to each other within the above limit, it is not possible with the apparatus or systems of this invention to obtain the new results previously described. Preferably the planes of these top and bottom surfaces will be parallel to each other within about 1 mil (0.0001 inch) over the diameter of the disc.

The bottom surface of the body is desirably provided with a reflective coating 13 suitably of silver or aluminum so that light striking the top surface of disc 10 and entering the disc will be reflected back through the top of the body for resolution and visual examination. The reflective coating will suitably be of the order of 0.002 mm. thick but may be substantially thinner or thicker without substantial detrimental effect upon the function of the disc or the apparatus of this invention in which it is incorporated. In fact, as previously indicated and later described, it may in some instances be desirable not to provide disc 10 with a reflective coating or a coating of any kind.

Disc 10 and the Faraday bodies of this invention generally may be composed of a number of different materials These materials, however, will all have in common the Faraday or magneto-optic phenomenon or effect. A cerous phosphate glass is preferred for this body but other glasses containing dysprosium ions instead of or in addition to the cerous ions may be used. The cerium metaphosphate glass plate, which is a standard commodity of commerce and is presently marketed by Bausch and Lomb Optical Company is satisfactory for use according to this invention, but must be ground and polished to the physical requirements set out above and in the appended claims. The important feature is that disc 10 and Faraday bodies of this invention generally are glasslike and accordingly are capable of being ground and polished to produce the optically smooth surfaces necessary to the foregoing new results. Those skilled in the art, however, will understand that disc 10 and other bodies like it need not be capable of transmitting visible light in order to be of utility and value in accordance with this invention. If such bodies are capable of transmitting light rays which are not in the visible lightwave frequency range, these bodies may nevertheless be used to produce these new results providing a suitable source of light rays of sufficient energy is available and also provided that suitable readout means for such invisible light is incorporated in the system. The thickness of the body or disc is important from the standpoint of resolution and sensitivity.

Referring to FIGURE 2, disc 10 is incorporated in an apparatus having special value and utility for the measurement of inhomogenous strains in superconducting films. This apparatus comprises, in addition to disc 10, two Dewar flasks 15 and 15a. The inner one (15) contains a body of liquid helium 16 and the outer one (15a) contains liquid nitrogen. Closure means for the flasks comprises a cap 18 fitted with a vent pipe 19 which may be connected to a vacuum pump (not shown) for evacuating the volume above the surface of liquid helium body 16 in flask 15. Cap 18 has a central aperture 21 of diameter greater than that of disc 10 for the direction of light beans downwardly and generally axially of flask 15 for examination of magnetic fields as indicated by the disc. Support means in the form of a non-magnetic thin walled stainless steel cylinder 23 is secured at its upper end to cap 18 around aperture 21 and thus extends downwardly into liquid helium body 16. At its lower end, the cylinder is closed by a cap 24 of non-magnetic material, suitably brass, and cylinder 23 and cap 24 are firmly secured together, as by compression seals made by aluminum O ring 25. Cap 24 in turn is provided with a recess in its upper surface in which to receive a superconducting film specimen comprising a glass substrate body 27 on the upper surface of which superconducting film sample 28 is carried. Disc 10 is disposed above film 28 as shown in FIGURE 3, with reflecting or mirror coating 13 resting directly on top of the superconducting film.

A solenoid 30 is fixed to brass cap 24, with cap 24 being situated in approximately the mid-section of the solenoid as seen in FIGURE 2. The solenoid is fitted closely in cylinder 23 and is held in the position illustrated by a snap lock arrangement around its upper periphery by means of a brass collar 29 which is welded to the cylinder.

The optical system of the apparatus of FIGURE 2 comprises a light source 32, suitably a mercury arc lamp, a condensing lens 33, a polarizer 34, an interference filter 35, a front surface mirror 36 and an analyzer 37. Condensing lens 33 in this case is a three-inch diameter lens of five-inch focal length. Polarizer 34 is a Polaroid HN32D Spx glass laminated linear polarizer (Polaroid Corporation) while filter 42 is effective to admit only monochromatic light to interference filter 35. Filter 35 is a type A50/50N (Fish-Schurman Corp.) and analyzer 37 is also a Polaroid HN32D Spx glass laminated linear polarizer. These components are enclosed and supported in a suitable housing which, as indicated in the drawing, rests on top of cap 18 and is positioned with interference filter 35 and mirror 36 centered over aperture 21. Housing 40, like cap 18, is suitably of metal construction and is adapted to be temporarily secured to the cap and in the embodiment illustrated is provided with a monochromatic filter 42 through which light from source 32 may enter the housing and a window opening 44 wherein analyzer 37 is mounted opposite viewing location 46. Interference filter 35 and mirror 36 are disposed within housing 40 at substantially right angles to each other and at approximately 45° to the respective windows 42 and window opening 44. It will be understood that the light source, condensing lens and polarizer elements as well as the viewing panel may if desired be enclosed in lateral extensions (not shown) of housing 40.

The assembly illustrated in FIGURE 4 is designed to be received in flask 15 in place of supporting cylinder 23 and the components connected thereto including solenoid 30 and cap 24. Accordingly solenoid 47 of FIGURE 4 in use is disposed in flask 15, being submerged in liquid helium body 16 and suitably resting on the bottom of the flask in upright position if supporting cylinders not used. Disc 10 is disposed within the iore of solenoid 47 and is supported upon a rod 49 which extends upwardly through the top of flask 15 and is moveable axially and laterally of the solenoid so as to enable detection and measurement of a part of a magnetic field at any point within the solenoid core. If desired, the solenoid may be supported as in the case of FIGURE 2 and manual means may be provided for probing the solenoid core with disc 10. In this case, housing 40 and the optical system elements associated therewith would be disposed to permit easy access of rod 49 and movement of the rod to adjust the position of disc 10 within solenoid 47 below the surface of liquid helium body 16. Disc 10, as FIGURE 4 illustrates, is secured to the lower end of rod 49 above the rebent portion thereof, the silvered surface of the bottom of disc 10 being attached to the rod end by means of a suitable adhesive or non-magnetic metallic or non-metallic holder.

The measurement of pressures particularly under conditions of extremely low temperature such as the temperature of liquid helium or that of liquid hydrogen may readily and accurately be made by means of the apparatus illustrated in FIGURE 5. This apparatus comprises a disc 10 as described above in reference to FIGURE 1, a superconducting closed coil 52 and means for varying the magnetic field in disc 10 including a superconducting disc 54 of high critical field which is moveable toward and away from coil 52 and is opposed thereto. An optical system suitably essentially the same as that described above in reference to FIGURE 2 completes the general assembly. Analyzer 46 is equipped with a vernier (not shown) for measurement of the degree of rotation of the plane of the light transmitted to the analyzer. Thus by comparing vernier readings taken before and after a change in the magnetic field to which plate 10 is subjected, small pressure changes can be detected and accurately measured. Coil 52 is mounted in an annular recess provided in the upper part of a supporting iron plate 56 of non-superconducting material and disc 10 is supported on plate 56 in position so that disc 10 is subject to the magnetic field produced by coil 52. By virtue of its high permeability, plate 56 serves the important purpose in this combination of concentrating the magnetic field of coil 52, thereby maximizing the sensitivity of the pressure measuring system. As shown in FIGURE 5, disc 10 is disposed on edge adjacent to coil 52 so that the disc is largely within the magnetic field of the coil or in the center of superconducting path perpendicular to the horizontal light beam as shown in FIGURE 5. Disc 54 is carried by an assembly including actuating lever 59 securely fastened to disc 54 so that as the lever is moved vertically relative to plate 56, disc 54 will be moved as the drawing indicates, to change the flux density of the field as the pressure is measured or reduce the flux density as the pressure on 54 is decreased.

The assembly, including the superconducting coil and superconducting disc 54 and the novel Faraday disc 10 is shown submerged in a body of liquid helium 60 contained in a flask generally indicated at 61. The lower portion of flask 61 is provided with a window 63 opposite which disc 10 is situated when the assembly is in operating position so that polarized light from source 32 may be directed against disc 10 and reflected thereby to mirror 36 as previously described.

In the operation of the FIGURE 5 apparatus, as in the case of FIGURE 2, light is generated by mercury arc 32 and polarized and then directed against disc 10. In the portions of disc 10 subject to magnetic field, light reflected back through the top or uncoated surface of the disc, will be rotated to some extent and will therefore pass through interference filter 36 to analyzer 37. Pressure induced on superconducting plate 54 is read directly on a vernier calibrated with the rotation of the analyzer necessary to extinguish the light or with the rotation required for maximum brightness to minimize brightness. From this rotation the field is known directly from previous calibration of the glass. If the field or flux density is known, pressure is also known since there is a well known relationship between pressure and flux density. This is attributable to the fact that polarized light incident to the top or uncoated surface of disc 10 will enter the disc and be reflected by the mirror surface on the back of the disc and will leave the disc unchanged as to polarity and thus will not penetrate the filter 35. Polarized light entering portions of the disc effected by a magnetic field on the other hand will be rotated or changed as to polarity, as the arrows in FIGURE 3 indicate, and will therefore pass through the filter and will be seen at the viewing panel as they emerge from analyzer 37.

In the use of the apparatus of FIGURES 2 and 5, suitable electric connections (not shown) are made to solenoid 30 and power is thereby provided to produce the magnetic fields illustrated in FIGURES 3 and 5. In coil 52 power is required only initially to induce a current in the superconducting coil. With light source 32 turned on the form of the magnetic field at the test location of disc 10 can be directly viewed by the observer at observation station 46, and in the case of the FIGURE 5 equipment the changes in the disposition or geometry of the magnetic field will be noted as pressure changes in the system resulting in relative vertical movement of superconducting disc 54. Thus in one case a static or stationary condition is observed and in the other a transient or dynamic condition is observed and yet in both cases the new Faraday disc of this invention is employed and the same principle of operation is involved.

In FIGURE 4, as n FIGURE 5, the viewer will observe changing flux density of the magnetic field as a result of relative motion of the disc and the magnetic field, the disc moving in one case through the field and the field moving in the other case through or relative to the disc.

As shown in FIGURE 6, disc 10 may be employed as an ammeter or as a central part of ammeter assembly, being situated adjacent to a conductor 64 in a position such that the disc is subject to the magnetic field of the conductor and variations in that field may be read by the optical system described above so as to indicate the current flowing in conductor 64. An annular iron body or ring 66 is disposed around conductor 64 to concentrate the magnetic field of the conductor and has a narrow slot 67 in which disc 10 is disposed, being supported in electrically insulated relationship to ring 66. Ring 66 further is provided with a bore 68 extending at right angles to top and bottom surfaces of disc 10 so that light from polarizer 34 may be directed through ring 66 and normal to the top surface of disc 10.

With reference to FIGURES 7 and 8, a Faraday body 70 generally rectangular in form but otherwise similar to disc 10 is designed as an electric circuit element, being provided with a reflective coating 71 over a large part of its bottom surface and having electric conductors in the form of films deposited on and firmly secured to the body. Silver coating 71 is covered with an electrically-insulating layer 73 of silicon monoxide (SiO) and four conductor elements 74, 75, 76, and 77 in the form of films are disposed on the SiO layer. These conductor films extend across the full width of body 70 and are insulated at all points from coating 71 and are adapted to be connected electrically and physically to leads making up a cryotron unit. The gate conductor of the cryotron then comprises a lead 80 connected to conductor 74, a lead 81 connected both to conductor 74 and to conductor 77, and a third lead 82 connected to conductor 77 and completing the loop as shown in FIGURE 7. The control conductor likewise comprises conductors 75 and 76 which are connected in a similar loop by means of leads 84, 85 and 86 with lead 85 connecting conductors 75 and 78 while leads 84 and 86, respectively, are connected to conductors 75 and 76.

One portion of body 70 has deposited on its bottom surface a conductor 90 in the form of a film of a metal which is superconducting at liquid helium temperatures. As in the case of conductors 74, 75, 76 and 77, conductor 90 is adapted to be connected as shown in FIGURE 7 to leads 91 and 92 so that conductor 90 can be connected into an electric circuit.

As in the case of disc 10, Faraday body 70 may be incorporated in an optical system as described above in reference to FIGURE 5. Thus, variations in magnetic field to which body 70 is subjected as a result of current flow through one or the other of conductors 74, 75, 76, 77 and 90 may be directly viewed by an observer at observation station 46.

Having thus described this invention in such full, clear, concise and exact terms as to enable any person skilled in the art to which it pertains to make and use the same, and having set forth the best mode contemplated of carrying out this invention, I state that the subject matter which I regard as being my invention is particularly pointed out and distinctly claimed in what is claimed, it being understood that equivalents or modifications of, or substitutions for, parts of the specifically described embodiments of the invention may be made without departing from the scope of the invention as set forth in what is claimed.

What I claim as new and desire to secure by Letters Patent of the United States is:

1. A light-transmitting, plate-like body of cerous phosphate glass having optically-smooth top and bottom surfaces and having the magneto-optic Faraday property, one of said surfaces of the body being coated for the reflection of light beams incident to the other said surface.

2. A light-transmitting, plate-like cerous phosphate glass body less than approximately 1.5 mm. thick having optically smooth top and bottom surfaces in planes parallel to each other within about 0.0005 inch over the greatest dimension of the body, said body having the magneto-optic Faraday property and the bottom surface of the body being silvered for the reflection of light beams incident to the top surface.

3. A light-transmitting, plate-like, magneto-optic Faraday body of cerous phosphate glass less than approximately 0.5 mm. thick having optically smooth top and bottom surfaces and being substantially free from cracks and other light transmission-impairing defects, one of said surfaces of the body having a coating approximately 0.002 mm. thick of a metal selected from the group consisting of silver and aluminum.

4. A visible-light-transmitting, plate-like body of cerous phosphate glass less than approximately 0.5 mm. thick having optically smooth top and bottom surfaces disposed in planes parallel to each other within about 0.0001 inch over the greatest dimension of the body, said body being substantially free from cracks and other light-transmission-impairing defects and having over substantially its entire bottom surface a coating approximately 0.002 mm. thick of a metal selected from the group consisting of silver and aluminum.

5. A light-transmitting, plate-like body of cerous phosphate glass having optically smooth top and bottom surfaces and having the magneto-optic Faraday property, one of said surfaces of the body having a first inner coating of a metal selected from the group consisting of silver and aluminum and having a second outer coating of a dielectric substance to electrically insulate the body from supporting structure.

References Cited

UNITED STATES PATENTS

| | | | |
|---|---|---|---|
| 2,442,396 | 6/1948 | Bubb et al. | 88—61 |
| 2,560,430 | 7/1951 | Friend | 88—61 |
| 2,928,075 | 3/1960 | Anderson | 250—225 |
| 2,989,714 | 6/1961 | Park | 340—173.1 |
| 3,079,508 | 2/1963 | Rabinovici | 340—173.1 |

OTHER REFERENCES

"Electronics," publication, July 22, 1960, pp. 76–78, TK7800.E58, vol. 33, 340–173.1.

"Physical Review," publication, vol. 105, January 1957, pp. 104–108, QC1.P4.

RUDOLPH V. ROLINEC, *Primary Examiner.*

G. R. STRECKER, *Assistant Examiner.*